US009480045B2

(12) United States Patent
Bejerano et al.

(10) Patent No.: US 9,480,045 B2
(45) Date of Patent: Oct. 25, 2016

(54) NETWORKS AND METHODS FOR PAGING MESSAGE CONTROL

(75) Inventors: Yigal Bejerano, Springfield, NJ (US); Katherine Guo, Scotch Plains, NJ (US); Thyagarajan Nandagopal, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/272,842

(22) Filed: Oct. 13, 2011

(65) Prior Publication Data

US 2013/0095862 A1    Apr. 18, 2013

(51) Int. Cl.
*H04W 68/00* (2009.01)
*H04W 68/02* (2009.01)

(52) U.S. Cl.
CPC .................................... *H04W 68/02* (2013.01)
USPC .................... 455/458; 455/445; 455/456.1

(58) Field of Classification Search
CPC ... H04W 68/00; H04W 68/02; H04W 68/06; H04W 40/00; H04W 40/02; H04W 4/18; H04W 40/34; H04W 88/16
USPC ...................... 455/445, 456.1, 458
See application file for complete search history.

(56) References Cited

U.S. PATENT DOCUMENTS

| | | | |
|---|---|---|---|
| 6,785,287 B1* | 8/2004 | Honkala et al. | 370/401 |
| 6,834,191 B2* | 12/2004 | Wallentin et al. | 455/442 |
| 8,787,929 B2* | 7/2014 | Dingler et al. | 455/456.1 |
| 2003/0117966 A1* | 6/2003 | Chen | 370/255 |
| 2005/0221831 A1* | 10/2005 | Pecen et al. | 455/445 |
| 2005/0239546 A1* | 10/2005 | Hedrick et al. | 463/29 |
| 2007/0232321 A1* | 10/2007 | Casati et al. | 455/456.1 |
| 2008/0057919 A1 | 3/2008 | Choi-Grogan et al. | |
| 2008/0057939 A1 | 3/2008 | Choi-Grogan | |
| 2008/0293419 A1* | 11/2008 | Somasundaram et al. | 455/437 |
| 2009/0291695 A1* | 11/2009 | Lipford et al. | 455/458 |
| 2010/0069088 A1* | 3/2010 | Fischer | 455/456.1 |
| 2010/0075625 A1* | 3/2010 | Wu | 455/404.1 |
| 2010/0246467 A1* | 9/2010 | Song et al. | 370/312 |
| 2010/0331011 A1* | 12/2010 | Vikberg et al. | 455/456.1 |
| 2011/0053616 A1* | 3/2011 | Lee et al. | 455/458 |
| 2011/0263274 A1* | 10/2011 | Fox et al. | 455/456.2 |

(Continued)

FOREIGN PATENT DOCUMENTS

WO    WO-2010148749 A1    12/2010

OTHER PUBLICATIONS

3rd Generation Partnership Project; Technical Specification Group Services and System Aspects; General Packet Radio Service (GPRS) enhancements forEvolved Universal Terrestrial Radio Access Network (E-UTRAN) access, (2010).

(Continued)

*Primary Examiner* — Shantell L Heiber
(74) *Attorney, Agent, or Firm* — Harness, Dickey & Pierce, P.L.C.

(57) ABSTRACT

At least one example embodiment discloses a paging message controller. The paging message controller includes a processor and an associated memory. The processor is configured to obtain an indication of a paging message for a user equipment (UE), the indication indicating that a paging message is to be forwarded to at least one destination cell of a first set of cells for paging the UE, and forward the paging message for paging the UE to at least one destination cell of a second set of cells in response to the indication.

25 Claims, 5 Drawing Sheets

(56) References Cited

U.S. PATENT DOCUMENTS

2011/0317659 A1* 12/2011 Ramachandran et al. .... 370/331
2012/0195228 A1 8/2012 Bejerano et al.

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2 (2010).
3rd Generation Partnership Project; Technical Specification Group Radio Access Network; Evolved Universal Terrestrial Radio Access Network (E-UTRAN); S1 Application Protocol (S1AP), (2010).
3rd Generation Partnership Project; Technical Specification Group Services and System Aspects; Provision of User Equipment Specific Behaviour Information (UESBI) to network entities, (2004).
Alcatel: "Location management, Paging, Intra-radio access mobility in LTE_IDLE", 3GPP Draft; REV-05167_VRF_PCF Concepts, 3rd Generation Partnership Project (3GPP), Mobile Competence Centre; 650, Route Des Lucioles; F-06921 Sophia-Antipolis Cedex; France, vol. RAN WGLTE, No. Tallinn; 20050918, Sep. 18, 2005, XP050189998.
International Search Report dated Nov. 16, 2012 for International Application No. PCT/US2012/058669.
Office Action from corresponding Japanese Patent Application No. 2014-535751, dated Mar. 12, 2015.

* cited by examiner

NETWORKS AND METHODS FOR PAGING MESSAGE CONTROL

BACKGROUND

Contemporary wireless communication systems may be characterized by multiple radio access technologies, such as Universal Telecommunications System (UMTS), Long Term Evolution (LTE) and IEEE 802.11 services such as Wi-Fi.

A multi-mode user equipment (UE) may have capabilities that are compatible with two or more radio access technologies.

In a wireless network, from a mobility perspective, a UE can be in one of three modes: connected/active, detached/inactive, or idle/sleep. By definition, when the UE is switched off or when the UE is just switched on and in the process of searching and registering with the network, the UE is in the detached mode.

In the detached mode, the location of the UE is unknown. In the active mode, the UE is registered with the network and has a radio connection with the base station, which allows the wireless network to know which cell the UE belongs to and allows the base station to exchange data with the UE.

In the idle mode, the UE does not transmit or receive data. In the idle mode, only higher level nodes in the network (for example, the Mobility Management Entity (MME) in LTE and the Serving General Packet Radio Service Support Node (SGSN) in UMTS) know an approximate location of the UE.

Routing areas (RA), in UMTS, and tracking areas (TAs), in LTE, are used to determine the approximate location of the UE. Each routing area or tracking area consists of multiple cells. In the active mode, the UE tracks its own location by recording a current routing area identifier in UMTS or tracking area identifier in LTE.

When the UE's routing area changes, the UE updates a SGSN in UMTS.

In order to reduce the number of update signaling messages from the UE to the network in LTE, a number of techniques are employed. The MME stores a list of tracking areas for each UE. If the UE simply changes tracking areas within the list, no tracking area update process is performed and no tracking area update messages are generated at the UE. This has the same effect as enlarging the number of cells included in each tracking area.

Because UMTS and other radio access technologies will coexist with LTE, and UEs are capable of handling multiple radio access technologies, LTE eliminates some of the signaling messages by assigning both a routing area and a tracking area to each UE. As a result, if the UE is moving within cells that belong to the routing area or the tracking area (with different radio access technologies, for example, UTMS or LTE), no update messages are required. When new data traffic arrives for the UE, the UE is paged by the base station in both radio access technologies simultaneously and depending on the radio access network in which the UE responds, data traffic is forwarded through that radio access network. This process is referred to as "IDLE mode signaling reduction function" in LTE and specified in 3GPP TS 23.401-v9.4.0, *General Packet Radio Service (GPRS) enhancements for Evolved Universal Terrestrial Radio Access Network (E-UTRAN) access (Release 9)*, March 2010.

When a call or a message for the UE arrives and the wireless network knows the UE is in the idle/sleep mode, the network uses the paging process to wake up the UE to establish a connection with the network. When the UE is in detached/inactive mode, the wireless network does not have any accurate information regarding where the UE is and, therefore, no paging process is used.

SUMMARY

A significant portion of a network's capacity is used for signaling messages. To reduce signaling cost in cellular networks, example embodiments reduce a paging message load to reduce an overall signaling message load in a radio access network in a cellular network. For example, in LTE, the MME keeps a list of tracking areas for each UE. If the UE changes tracking areas within the list of tracking areas, no tracking area update process is done and no tracking area update messages are generated at the UE. This process has the same effect of enlarging a number of cells included in each tracking area.

Example embodiments disclose a Tracking Application Server (T-AS) configured to gather a UE's cell level location information periodically. The cell level location information is transmitted to a network element that initiates a paging process in order to reduce paging areas. To reduce a load for tracking area update messages in the cellular network, the UE uses a secondary radio interface (for example, Wi-Fi) to report its location to a selected mobile node, termed cluster head (CH), in its vicinity. Thus, the UE can report cell level location information when the primary interface is off or in an idle mode. The CH node then contacts the Tracking Application Server (T-AS) on behalf of all nodes in its vicinity, thereby offloading a majority of tracking area messages to the secondary radio interface.

As a result of the tracking area messages, the paging area is reduced and, therefore, the paging message load is reduced in the cellular network without causing a high load of tracking area messages.

At least one example embodiment discloses a paging message controller. The paging message controller includes a processor and an associated memory. The processor is configured to obtain an indication of a paging message for a user equipment (UE), the indication indicating that a paging message is to be forwarded to at least one destination cell of a first set of cells for paging the UE, and forward the paging message for paging the UE to at least one destination cell of a second set of cells in response to the indication.

The first set of cells may consist of all cells of a routing area or tracking area.

The second set of cells may be smaller than the first set of cells, a subset of the first set of cells, or a subset of and smaller than the first set of cells.

The paging message controller is configured to receive the second set of cells from a tracking application server.

The second set of cells may be for identifying a group of cells visited by the UE in a time period. The time period may be a time since the UE was last connected to the RAN.

The paging message controller may further include an associated tracking application server (T-AS), the associated T-AS configured to receive cell level location information. The cell level location information identifies a user equipment-to-cell identifier (UE-to-cell identifier) mapping for the UE. The T-AS is further configured to update the second set of cells for the UE based on a cell identifier of the UE-to-cell identifier mapping.

The associated T-AS is configured to receive the cell level location information over a Universal Mobile Telecommunications System Terrestrial Radio Access Network (UTRAN) interface, a Long Term Evolution (LTE) network interface, or a IEEE 802.11 network interface.

The indication may indicate that the paging message is to be forwarded to a list of cells in a routing area or a tracking area. The processor is configured to modify the indication. The indication so modified indicates that the paging message is to be forwarded to the second set of cells.

The indication may indicate that the paging message is to be forwarded to a first cell of the first set of cells. The processor is configured to filter the paging message for paging the UE based on whether the first cell of the first set of cells is also a member of the second set of cells.

The indication may be a paging message for a first cell, and the processor is configured to forward the paging message when the first cell is a member of the second set of cells.

The processor is configured to suppress the paging message when the first cell is not a member of the second set of cells.

The processor is configured to determine if the UE received at least one forwarded paging message and transmit at least one paging message that was suppressed when the determining determines the UE did not receive at least one forwarded paging message.

At least another example embodiment discloses a method of controlling paging in a radio access network (RAN). The method includes obtaining at a paging controller an indication of a paging message for a user equipment (UE). The indication indicating that at least one paging message is to be forwarded to at least one destination cell of a first set of cells for paging the UE. The method further includes forwarding at the paging controller a paging message for paging the UE to at least one destination cell of a second set of cells in response to the indication.

The first set of cells may consist of all cells of a routing area or tracking area.

The second set of cells may be smaller than the first set of cells, a subset of the first set of cells, or a subset of and smaller than the first set of cells.

The second set of cells is received from a tracking application server and identifies a group of cells visited by the UE in a time period.

The method may further include receiving cell level location information at a tracking application server (T-AS), wherein the cell level location information identifies a user equipment-to-cell identifier (UE-to-cell identifier) mapping for the UE, and updating at the T-AS the second set of cells for the UE based on a cell identifier of the UE-to-cell identifier mapping.

The cell level location information is received over a Universal Mobile Telecommunications System Terrestrial Radio Access Network (UTRAN) interface, a Long Term Evolution (LTE) network interface, or a IEEE 802.11 network interface.

The indication may indicate that the paging message is to be forwarded to a list of cells in a routing area or a tracking area. The forwarding includes modifying the indication. The indication so modified indicates that the paging message is to be forwarded to the second set of cells.

The indication may be a paging message for a first cell, and the forwarding may include forwarding the paging message when the first cell is a member of the second set of cells.

The forwarding may include suppressing the paging message when the first cell is not a member of the second set of cells.

The method may further include determining if the UE received at least one forwarded paging message and transmitting at least one paging message that was suppressed when the determining determines the UE did not receive at least one forwarded paging message.

At least one example embodiment provides a method of reducing a paging area in a radio access network (RAN). The method includes receiving location information from a user equipment (UE). The UE is configured to communicate over at least one of a primary interface and a secondary interface and the receiving location information receives the location information over the secondary interface. The method further includes determining a first tracking area of the UE based on the location information, and transmitting a paging message for the UE to the first tracking area over the primary interface.

At least another example embodiment provides a network including a paging message controller. The paging message controller is configured to, receive a paging message from a network controller of a radio access network (RAN). The paging message identifies a first tracking area and the first tracking area is defined in a standard of the RAN. The paging message controller is configured to change the first tracking area in the paging message to a second tracking area. The second tracking area is based on location information of a user equipment (UE). The UE is configured to communicate over at least one of a primary interface and a secondary interface. The location information is transmitted over the secondary interface. The paging message controller is further configured to transmit the paging message for the UE to the second tracking area.

At least another example embodiment provides for a user equipment (UE) configured to communicate over at least one of a primary interface and a secondary interface, transmit location information over a secondary interface and receive a paging message over the primary interface. The paging message is based on the location information.

BRIEF DESCRIPTION OF THE DRAWINGS

Example embodiments will be more clearly understood from the following detailed description taken in conjunction with the accompanying drawings. FIGS. 1-4B represent non-limiting, example embodiments as described herein.

FIG. 1 illustrates a cellular network;

FIGS. 2A-3B illustrate example embodiments of networks incorporating a paging message controller (PMC) and a tracking application server (T-AS); and FIGS. 4A-4B illustrate a method of reducing a paging area.

DETAILED DESCRIPTION

Figure 1:
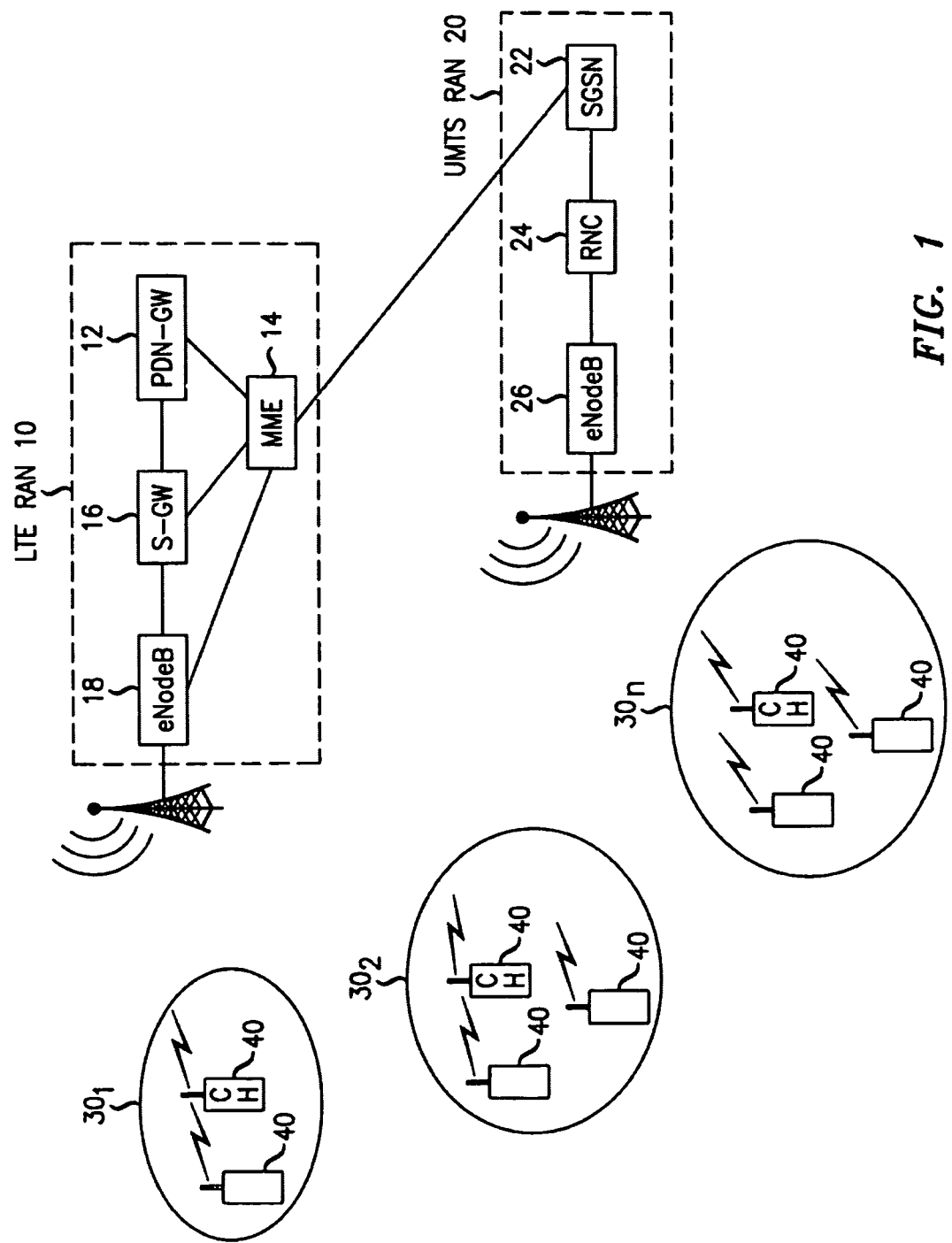

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes (e.g., a scheduler located at a cell site, base station or Node B). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium. The tangible storage medium may be magnetic (e.g., a floppy disk or a hard drive) or optical (e.g., a compact disk read only memory, or "CD ROM"), and may be read only or random access. Example embodiments are not limited by these aspects of any given implementation.

As used herein, the term "user equipment" (UE) may be synonymous to a mobile user, mobile station, mobile terminal, user, subscriber, wireless terminal and/or remote station and may describe a remote user of wireless resources in a wireless communication network.

While example embodiments are described in terms of UEs having dual radio access to a cellular wireless communication system such as LTE and/or UMTS and to an IEEE 802.11 system such as Wi-Fi, it should be readily apparent that example embodiments are applicable to networks of UEs having dual radio access to any cellular network combinations.

FIG. 1 illustrates a cellular network according to an example embodiment. As shown in FIG. 1, the cellular network includes an LTE RAN 10 and a UMTS RAN 20. The LTE RAN 10 and UMTS RAN 20 are configured to communicate with a plurality of UEs 40.

The LTE RAN 10 includes a packet data network gateway (PDN-GW) 12, a Mobility Management Entity (MME) 14, a serving gateway (S-GW) 16 and an enhanced NodeB (eNodeB) 18. The MME 14 is a main control-plane node in the LTE RAN 10. The eNodeB 18 is connected via a signaling path to the MME 14, and via a data path to the S-GW 16. The MME 14 has signaling connections to the eNodeB 18, S-GW 16 and PDN-GW 12.

The eNodeB 18 is controlled by the MME/S-GW pair, and a single MME/S-GW complex generally represents a large geographic area, with scores of cells. When a UE 40 enters the LTE RAN 10, the UE 40 first registers itself with the MME 14 (via the eNodeB 18), and establishes a control channel with the MME 14. When the UE 40 sends data, the UE 40 first signals the eNodeB 18 to acquire a bearer channel for sending data. The eNodeB 18 (or another network entity) assigns the bearer, and informs the UE 40 about the bearer channel.

The UMTS RAN 20 includes an SGSN 22, a radio network controller (RNC) 24 and an eNodeB 26. The SGSN 22 and the RNC 24 are connected via both a signaling and a data path between them. The RNC 24 and the eNodeB 26 are connected via both a signaling and a data path between them. The SGSN 22 is connected to the MME 14 of the LTE RAN 10 via a signaling path.

The UEs 40 are configured as multi-mode terminals having at least two radio interfaces. A primary radio interface is used to communicate to a base station of the RAN, and the other as a secondary radio interface for access to an IEEE 802.11 network such as Wi-Fi or Wi-MAX. It is assumed for purpose of the description herein that the secondary radio interface is a Wi-Fi radio adhering to the IEEE 802.11 family of standards, but it should be understood that example embodiments are not so limited. The UEs 40 are configured to use the secondary radio interface to communicate with a Wi-Fi access point, or among themselves. As such, the UEs are considered to be in a peer-to-peer mode.

The UEs 40 are divided into a plurality of clusters $30_1$, $30_2$, ..., $30_n$, where n is the number of clusters.

The UEs 40 with both cellular and Wi-Fi interfaces form the clusters $30_1$, $30_2$, ..., $30_n$ through a Wi-Fi ad-hoc network. A UE 40 in each cluster $30_1, 30_2, ..., 30_n$ is elected as a Cluster Head (CH). Periodically, the CH monitors the cellular identifiers of the UEs 40 within its cluster. A cellular identifier is a unique number used to identify each base transceiver station (BTS) or a sector of a BTS. The eNodeB 26 in the UMTS RAN 20 is considered a BTS. Part of the eNodeB 18 in the LTE RAN 10 can be considered a BTS, as the eNodeB 18 contains more functionalities than a BTS. The cellular identifier may also be referred to as a cell identifier or a cell global identifier.

Because of the limited range of Wi-Fi ad-hoc networks (in the order of 10s of meters), all UEs 40 within a cluster may belong to the same cell. The CH aids in reducing signaling messages between the UEs 40 and, the LTE RAN 10 and the UMTS RAN 20. Clusters, Cluster Heads, and a cluster membership tracking mechanism are disclosed in U.S. application Ser. No. 13/017,206, entitled METHOD FOR IMPROVED TOPOLOGY MAPPING IN WIRELESS COMMUNICATION NETWORKS, filed Jan. 31, 2011, the entire contents of which are herein incorporated by reference.

As will be described in more detail with reference to FIGS. 2A-4B. Example embodiments utilize a network component called a paging message controller (PMC). The PMC may be a new network node inside the RAN or a software component residing on one of the existing radio access network elements. The PMC may include a processor and an associated memory. It should be understood that the functions performed by the PMC may be performed by the processor. As a new network element, in UMTS architecture, the PMC may reside between the SGSN and all the RNCs handled by the SGSN and, in LTE architecture, the PMC resides between the MME and all the eNodeBs handled by the MME in LTE. As a software component implemented in conjunction with a processor in an existing network element, the PMC may reside in the SGSN in UTMS and/or in the MME in LTE.

The PMC inspects and alters paging messages between the SGSN and RNCs in UMTS and between the MME and eNodeBs in LTE.

In example embodiments, a Tracking Application Server (T-AS) is used to track UEs. A cluster head (CH) UE periodically reports UE to cellular identifier (cell ID) mappings in its cluster to the T-AS. The UE to cell identifier mapping may be referred to as cell level location information for the UE. At any given time, a UE is at one location and, therefore, mapped to one cell which is either UMTS or LTE enabled. As time passes, and as the UE moves, the UE can be mapped to multiple cells with different RANs such as UMTS or LTE if the UE supports both technologies. When the T-AS receives each UE to cell identifier mapping from the CH, it assigns the mapping a timestamp. For each UE, the T-AS stores a list of cell IDs associated with the UE, each with a unique time stamp value. Each UE is equipped with a client application interfacing with the T-AS.

Once the T-AS collects the UE to cell identifier mappings over time and constructs the list of cell IDs for each UE, the T-AS may construct an Optimal Tracking Area (OTA) for each UE. The OTA, as well as the routing area and tracking area, are sets of cells and/or cell identifiers. Therefore, the OTA may include a list of IDs for cells visited by the UE in the recent past (a specific time period, e.g., since the UE was last connected). The T-AS transmits the OTA to the PMC inside the radio access network in order for the PMC to suppress paging messages.

A new interface I_ta is defined between the T-AS and the PMC. The interface I_ta allows the T-AS to send the OTA for each UE to the PMC.

The I_ta interface allows message exchanges between the T-AS and the PMC. One example of the I_ta interface includes the PMC sending a trigger message and a timer T_1 to the T-AS. Once the T-AS receives the trigger message, the T-AS will start the timer T_1. Whenever the timer T_1 expires, the T-AS sends the OTA for each UE to the PMC. In addition, the timer T_1 starts again at the T-AS. As a result, the T-AS sends its current OTA for each UE every T_1 period to the PMC.

In another example of the I_ta interface, the T-AS sends recent changes in the OTA for each UE, since the last time the T-AS sent the current and complete OTA information for each UE. The T-AS decides when to send the OTA changes. For example, the T-AS may send the OTA change in the form of an additional cell ID to be included in the UE's OTA at the PMC when the T-AS receives a new UE to cell identifier mapping not on the current OTA stored the T-AS. In another example, the T-AS may send the changes in the OTAs for one or more UEs when the T-AS receives more than X (where X≥1) UE to cell identifier mapping changes. Yet another example is when the T-AS receives at least Y (where Y>=1) UE to cell identifier mapping changes and when the elapsed time since the last full update sent to the PMC is at least T_2, where T_2 is less than T_1. In another example, the PMC may request the T-AS to send over the changes in the OTA for each UE since the last full update and other requests. In yet another example, the PMC may request specific OTAs or changes in OTAs for a selected group of one or more UEs instead of every UE for which the T-AS has the cell level information.

The I_ta interface allows the PMC to specify the parameters T_1, T_2, X, Y used by the T-AS if they are not defined by the T-AS.

FIGS. 2A-3B illustrate example embodiments of networks incorporating a PMC and a T-AS.

Figure 2A:
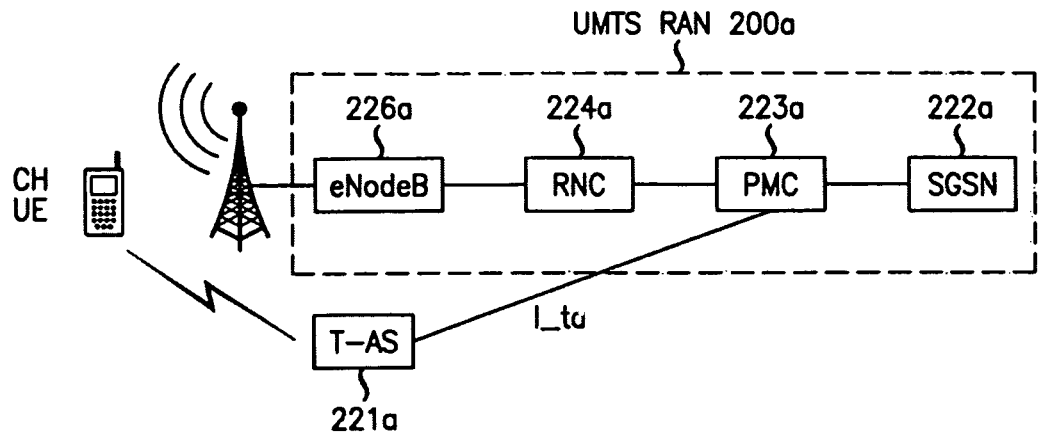

FIG. 2A illustrates an example embodiment of a UMTS RAN. As shown, a UMTS RAN 200a includes a SGSN 222a, a PMC 223a, a RNC 224a and an eNodeB 226a. A T-AS 221a is configured to communicate with the PMC 223a. The eNodeB 226a and RNC 224a are the same as the eNodeB 26 and the RNC 24, respectively, illustrated in FIG. 1. Therefore, for the sake of brevity, a description of the eNodeB 226a and RNC 224a will be omitted.

As shown, a cluster head UE may transmit cell level location information to the T-AS 221a. The T-AS 221a is configured to transmit the OTAs for one or more UEs to the PMC 223a over the interface I_ta. As shown, the PMC 223a is connected between the RNC 224a and SGSN 222a. In FIG. 2A, the PMC 223a is considered a network element.

Figure 2B:
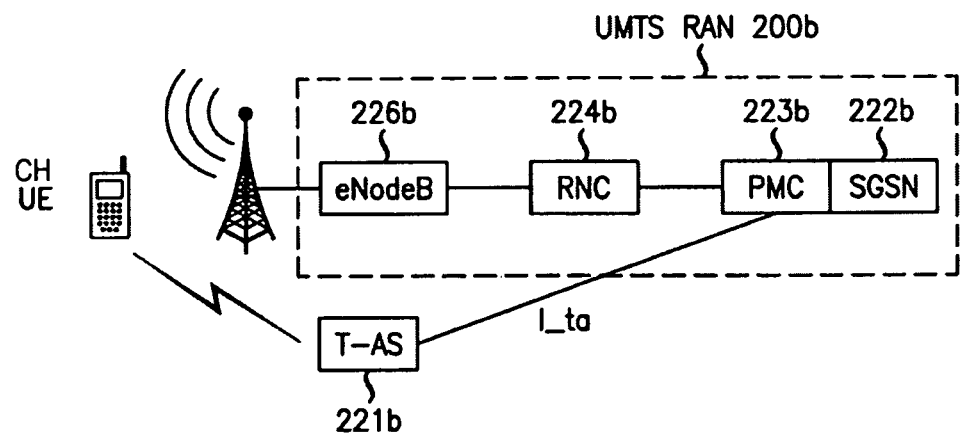

FIG. 2B illustrates an example embodiment of a UMTS RAN. As shown, a UMTS RAN 200b includes a SGSN 222b, a PMC 223b, a RNC 224b and an eNodeB 226b. A T-AS 221b is configured to communicate with the PMC 223b. The eNodeB 226b and RNC 224b are the same as the eNodeB 26 and the RNC 24, respectively, illustrated in FIG. 1. Therefore, for the sake of brevity, a description of the eNodeB 226b and RNC 224b will be omitted.

Additionally, the UMTS RAN 200b is the same as the UMTS RAN 200a, except that the PMC 223b is incorporated as a computer readable medium in the SGSN 222b or software encoded in the SGSN 222b in conjunction with an associated processor for executing the encoded software. Therefore, for the sake of brevity, a further description of the UMTS RAN 200b will be omitted.

Figure 3A:
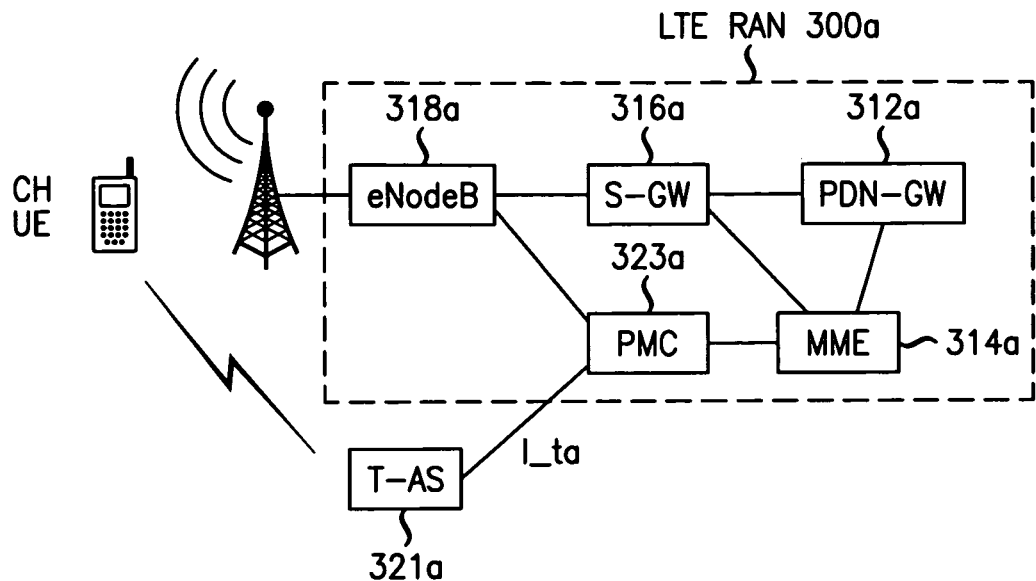

FIG. 3A illustrates an example embodiment of a LTE RAN. As shown, a LTE RAN 300a includes a PMC 323a, a MME 314a, a PDN-GW 312a, an S-GW 316a and an eNodeB 318a. A T-AS 321a is configured to communicate with the PMC 323a. The PDN-GW 312a, S-GW 316a and eNodeB 318a are the same as the PDN-GW 12, S-GW 16 and eNodeB 18, respectively, illustrated in FIG. 1. Therefore, for the sake of brevity, a description of the PDN-GW 312a, S-GW 316a and eNodeB 318a will be omitted.

As shown, a cluster head UE may transmit cell level location information to the T-AS 321a. The T-AS 321a is configured to transmit the OTAs for one or more UEs to the PMC 323a over the interface I_ta. As shown, the PMC 323a is connected between the MME 314a and the eNodeB 318a. In FIG. 3A, the PMC 323a is considered a network element.

Figure 3B:
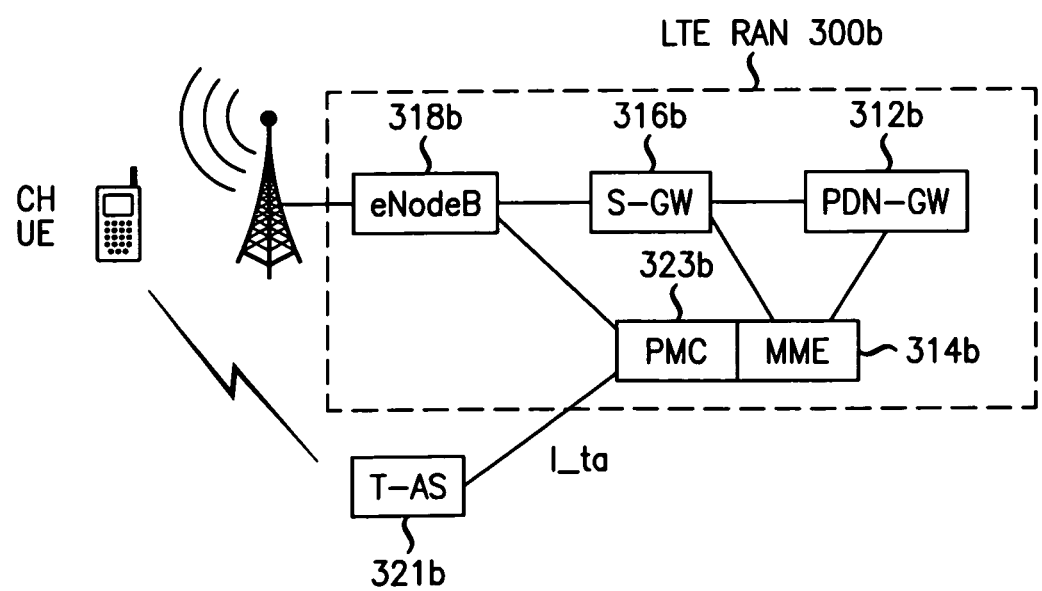

FIG. 3B illustrates an example embodiment of a LTE RAN. As shown, a LTE RAN 300b includes a PMC 323b, a MME 314b, a PDN-GW 312b, an S-GW 316b and an eNodeB 318b. A T-AS 321b is configured to communicate with the PMC 323b. The PDN-GW 312b, S-GW 316b and eNodeB 318b are the same as the PDN-GW 12, S-GW 16 and eNodeB 18, respectively, illustrated in FIG. 1. Therefore, for the sake of brevity, a description of the PDN-GW 312b, S-GW 316b and eNodeB 318b will be omitted.

Additionally, the LTE RAN 300b is the same as the LTE RAN 300a, except that the PMC 323b is incorporated as a computer readable medium in the MME 314b or software encoded in the MME 314b in conjunction with an associated processor for executing the encoded software. Therefore, for the sake of brevity, a further description of the LTE RAN 300b will be omitted.

The T-AS 221a, 221b, 321a, 321b may all be the same.

The functionality of the T-AS 221a, 221b, 321a, 321b, the PMC 223a, 223b, 323a, 323b, the SGSN 222a, 222b and the MME 314a, 314b is described in greater detail below.

Paging Area Reduction

In example embodiments, a UE's location is tracked by the T-AS to the detailed level of one or a few cells instead of higher levels of the routing area in UMTS and the tracking area or tracking area list in LTE.

The T-AS collects UE to cell identifier (ID) mappings periodically or whenever a UE changes cells. The T-AS collects the mapping over a UE's secondary interface (for example, Wi-Fi) outside of the RAN. As a result, the UE to cell ID mapping is updated to reflect a UE's movement between cells. In contrast, according to current 3GPP standards, the UE only reports to the RAN a routing area (RA) or tracking area (TA) list mapping when the UE changes a routing area or tracking area list in LTE. As a result, the UE to cell ID mapping is not updated to reflect the UE's movement between cells in conventional systems. Therefore, the UE to RA or TA list mapping in the 3GPP standards is maintained at a much higher level where each UE is mapped to a large list of cells grouped together in a RA or a list of TAs.

Instead of sending out paging messages to all the cells in the UE's routing area in UMTS or the UE's tracking area list in LTE simultaneously, the inventors have discovered that cluster membership information collected by the Cluster Head (CH) over a Wi-Fi ad-hoc network may be used to narrow down the location of an UE to a cell (or a few neighboring cells). A first paging request is generated by a SGSN (in UMTS) or a MME (in LTE) and sent to a number of cells in an optimal tracking area (OTA). The number of cells in the OTA is smaller than the number of cells in the routing area (in UMTS) or tracking area list (in LTE). Thus, the number of paging requests required to reach a UE is reduced. If the first paging request fails, the eNodeB may then send a paging request to all other cells in the UE's routing area in UMTS or tracking area list in LTE.

As specified in the 3GPP standards 3GPP TS 36.300-v9.4.0, *Evolved Universal Terrestrial Radio Access (E-UTRA) and Evolved Universal Terrestrial Radio Access Network (E-UTRAN); Overall description; Stage* 2 (*Release* 9), June 2010, and 3GPP TS 36.413-v9.3.0, *Evolved Universal Terrestrial Radio Access Network (E-UTRAN);* S1 *Application Protocol (S1AP)* (*Release* 9), June 2010, paging messages are generated by the SGSN in UMTS and the MME in LTE before passing down the hierarchical radio access network architecture to reach a set of UEs via broadcast on a paging channel in the RAN.

In conventional UMTS, the decision on which cell to send the paging message for an UE is made by the SGSN, and the SGSN sends the same paging message to all the cells constituting the routing area associated with the UE. Similarly, in conventional LTE, the decision is made by the MME, and the MME sends the same paging message to all the cells constituting the list of tracking areas associated with the UE.

Figure 4A:
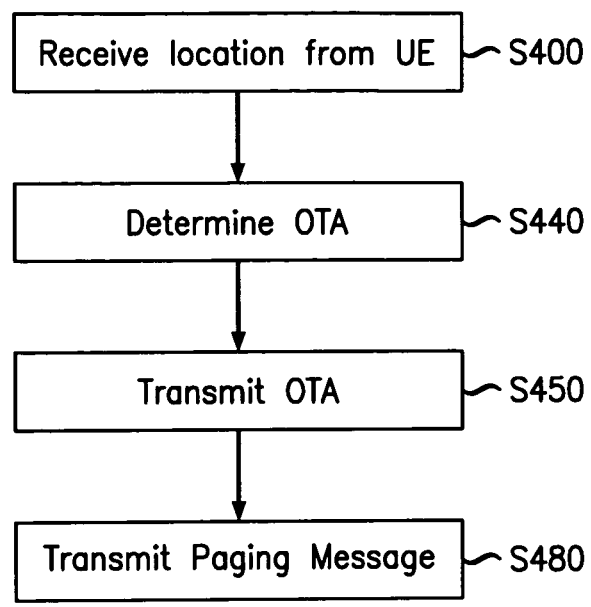
Figure 4B:
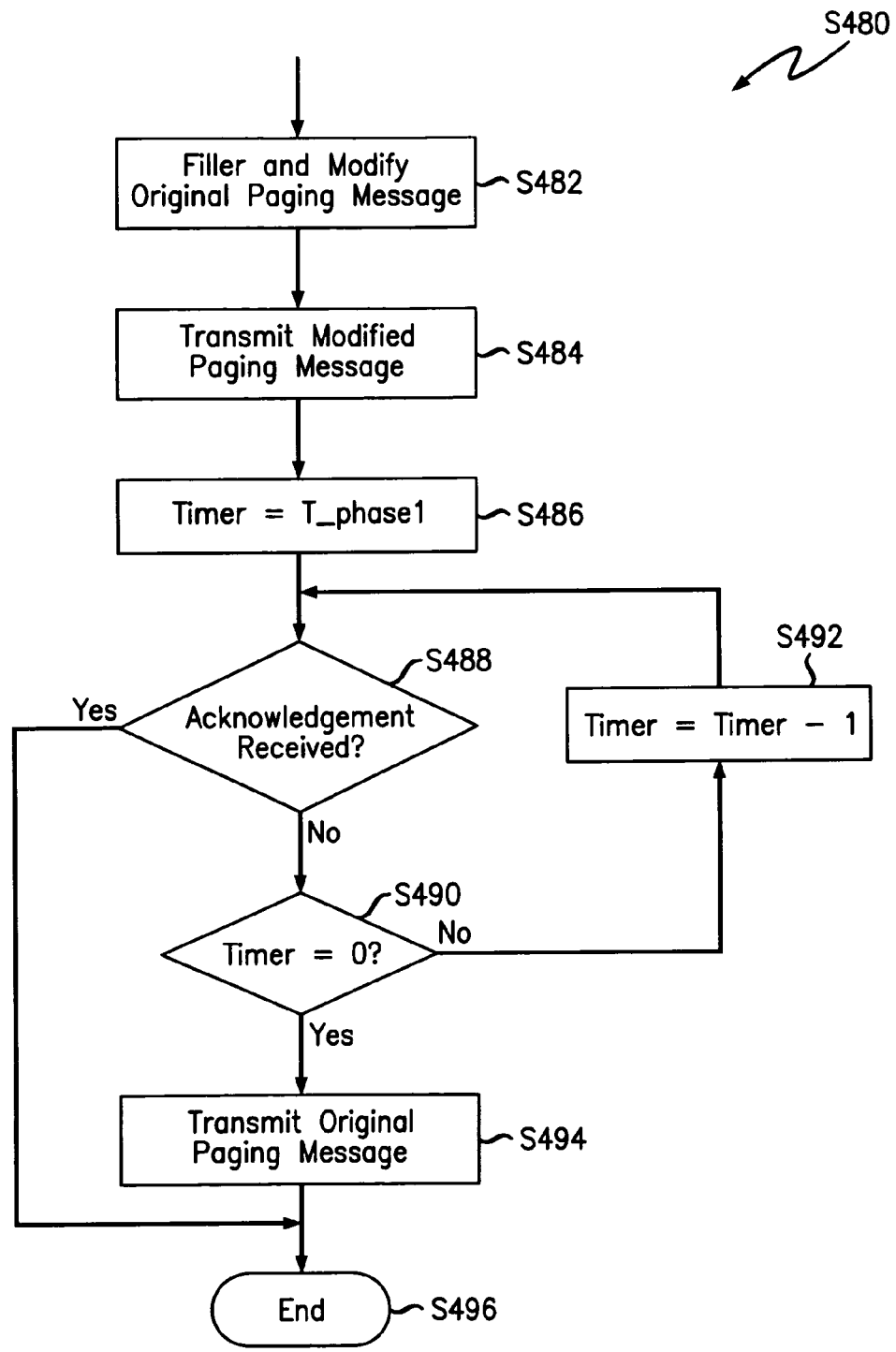

FIG. 4A illustrates a method of reducing a paging area. It should be understood that any of the example embodiments shown in FIGS. 2A-3B are configured to implement the method of reducing a paging area, shown in FIG. 4.

At S400, a T-AS receives cell level location information from a CH, which is a UE.

Periodically, the Cluster Head (CH) transmits, to the T-AS, a list of UEs within the cluster in the form of a list of UE to cell identifier mappings. The CH transmits the list of UE to cell identifier mappings to the T-AS over a secondary interface such as Wi-Fi or a primary interface through the RAN of the cellular network.

By transmitting the cell level location information periodically, the T-AS may receive location information at a higher frequency than in previous systems. In previous systems, location information is sent from a UE only when (1) the UE's primary interface is on and the UE changes cells that result in changes to its routing area or tracking area list or when (2) the UE's primary interface is on and a timer has expired.

In example embodiments, cell level location information is sent by a UE to the CH over the secondary interface, even when the primary interface is off. Consequently, the T-AS may receive more up-to-date information.

In order to report the cell level location information for the UEs within the cluster, a cluster head (CH) establishes an IP connection with the T-AS through the establishment of a bearer channel in the cellular RAN or through an available Wi-Fi network. The T-AS is an application server that resides outside of the RAN. The T-AS advertises its host name to IP address mapping through the domain name server (DNS) mechanism. The application running on the CH is provisioned with or configured with the host name for the T-AS. By using DNS, the CH is able to establish an IP connection with T-AS.

At S440, the T-AS determines the OTA based on the cell level location information received from each CH. The T-AS determines an OTA for each RAN a UE is configured to access. For example, if a UE may communicate over UMTS and LTE, the T-AS may determine two OTAs for the UE, a first for UMTS and a second for LTE. The T-AS forms the OTA by including a list of cells the UE has visited recently. In one example, an OTA includes a list of cells the UE has visited in a time period. Thus, the OTA may be based on the cells the UE has visited in the time period. Note that the OTA may include a subset of cells from a plurality of cells in a routing area and/or tracking area.

The time period may be configured to a static value during the T-AS setup and configuration time or it may be adjusted based on the success rate of paging the UE within its OTA. An OTA paging process is defined a success if the UE responds to the paging message sent to cells in the OTA. The paging is defined a failure if the UE does not respond to the paging message sent to cells in the OTA, but the UE responds to the paging message sent to cells in the original RA (in UMTS) or TA list (in LTE). In one example embodiment, the time period increases by a value $t\_a$ if the paging success rate drops below a threshold value $P\_low$, and the time period increases by a value $t\_b$ if the paging success rate increases above a threshold value $P\_high$. The parameters $t\_a$, $t\_b$, $P\_low$ and $P\_high$ can be configured or determined based on experiments within different networks. The time period can be determined by other mechanisms based on empirical study.

In UMTS and LTE, the RA or TA is specified statically including a group of cells when the cellular network is set up. Part of the cell identifier is the routing area identifier. Once a cell is deployed and operational, it has a fixed cell identifier. The OTA ignores which RA or TA the cell belongs to and, instead, includes individual cells.

This results in an OTA having a smaller list of cell identifiers than the routing area in UMTS and tracking area list in LTE. In an example embodiment, where there is only one T-AS handling the area covered by the RAN controlled by one SGSN in UMTS or S-GW/MME in LTE, the list stored by the T-AS may be referred to as the OTA. As described above, in LTE, the S-GW handles data traffic in a RAN and the MME handles control traffic in the RAN. The OTA identifies the list of cells for each UE's location. The T-AS constructs the OTA for each UE and periodically forwards the complete OTA for each UE or OTA changes for a subset of all UEs to the PMC.

In another example embodiment, multiple T-ASs may be configured for each SGSN in UMTS and S-GW/MME in LTE. In this example, each CH may select one T-AS to report a UE's cell level location information. The T-AS records UE to cell identifier mappings and constructs an OTA for each UE it has received information from. As a UE migrates from cell to cell, the CH may report its cell level location information to different T-AS nodes. As a result, the complete OTA can only be constructed and stored at the PMC after the PMC has gathered information from all the T-AS nodes serving the RAN controlled by the SGSN in UMTS or the S-GW/MME in LTE. Thus, each T-AS only constructs and stores partial OTA for some of the UEs in the RAN.

The T-AS may update the OTA for each UE periodically based on reports, including the cell level location information, from the CH UE for the UEs within the cluster. Generally, the T-AS is an application server located beyond the cellular RAN. However, 3GPP standards and/or LTE standards may be altered to include the T-AS as part of the RAN.

By receiving the cell level location information periodically, the T-AS may receive location information at a higher frequency than in previous systems. In previous systems, location information is sent from UE only when the UE's primary interface is on, and movement of the UE has resulted in a change in its routing area in UMTS and tracking area list in LTE. In example embodiments, cell level location information may be sent by a UE to the CH over the secondary interface, even when the primary interface of the UE is off. Since the T-AS may receive cell level information when the primary interface of the UE is off, the T-AS may have more up-to-date information and more detailed information at the level of cells instead of at the level of routing areas or tracking area lists, both of which include a large number of cells defined statically.

The T-AS also stores mapping information between an SGSN and a cell and/or a MME and a cell. Each cell belongs to one SGSN or MME. Based on the mapping information, the T-AS keeps a separate list of UEs for each RAN (served by one SGSN or MME). Thus, a UE can simultaneously be on the lists for multiple RANs if the UE can be served with multiple radio access technologies.

To summarize, there is an m-to-1 mapping between a UE and a cell and an n-to-1 mapping between a cell and a SGSN or MME in the RAN. In other words, each SGSN or MME may control multiple cells, and each cell may contain multiple UEs. The T-AS stores OTAs for all the UEs that report their cell identifiers. The T-AS may store the OTAs for all UEs in the RAN or only a subset of the UEs in the RAN.

The OTA may be formed by combining the current mapping with the previously determined mappings. When there is one T-AS node for the SGSN or the MME, the OTA can be formed at the T-AS and/or the PMC for the SGSN or MME. When there are multiple T-AS nodes for the SGSN or the MME, the OTA may be formed at the PMC for the SGSN or the MME after the PMC gathers mapping information regarding the UEs from different T-AS nodes.

Forming an OTA at the PMC results in more frequent messages from the T-AS to the PMC. If the T-AS does not form the OTA, then the T-AS passes to the PMC UE to cell ID mappings with a timestamp reflecting when the T-AS received the UE's cell level location information from the CH of the UE. After forming the OTA, the T-AS passes a more compact list of cell IDs for each UE without the timestamp information. The amount of information the T-AS sends to the PMC is much smaller if the OTA is constructed at the T-AS.

At S450, the T-AS transmits a signal including the UE's OTA to the PMC over an I_ta interface. The T-AS periodically sends the UE's OTA to the PMC. In an example embodiment where multiple T-ASs exist for a PMC, each T-AS transmits OTAs for a subset of UEs and the PMC determines the complete OTA for all the UEs in a RAN of the cellular network.

Existing interfaces between network elements in a RAN do not have to be altered in order to add the PMC. In UMTS, if the PMC is added as a network element between the RNC and the SGSN, as shown in FIG. 2A, then the PMC filters paging messages from the SGSN to the RNC to make necessary modifications and permits a remainder of the messages to pass through between the SGSN and the RNC in both uplink and downlink directions.

Similarly, in LTE, if the PMC is realized as a network element between the eNodeB and the MME, as shown in FIG. 3A, then the PMC filters paging messages from the MME to the eNodeB to make necessary modifications and permit a remainder of the messages to pass through between the MME and the eNodeB in both uplink and downlink directions.

If the PMC is realized as a software component used in conjunction with an associated processor for executing the encoded software on the SGSN in UMTS or on the MME in LTE, as shown in FIGS. 2B and 3B, respectively, then the PMC forwards modified paging messages over existing interfaces to the RNC in UMTS or the eNodeB in LTE. Again, no change is required to existing interfaces between the RNC and the SGSN in UMTS and between the eNodeB and the MME in LTE.

At S480, the PMC transmits a paging message based on the OTA. Step S480 is illustrated in more detail in FIG. 4B.

At S482, the PMC filters original paging messages and modifies destination cells of each original paging message generated by the SGSN in UMTS and the MME in LTE. The PMC examines a destination cell field of each incoming paging message from the SGSN or MME. The destination cells are changed from the list of cells in the routing area (for UMTS) or the tracking area list (for LTE) for the UE to cells of the OTA associated with the UE and the RAN.

The modification of paging messages at the PMC depends on how the PMC is implemented. If the PMC is a software component used in conjunction with an associated processor for executing the encoded software on the SGSN in UMTS and the MME in LTE, then the PMC modifies the list of destination cells for each paging message.

If the PMC is a network element in the RAN, then the PMC suppresses signaling messages sent from the SGSN/MME to the RNC/eNodeB to cells that are not on the OTA stored at the PMC for an UE. In other words, the PMC does not forward paging messages from the SGSN/MME to the RNC/eNodeB, respectively, to cells that are not on the OTA stored at the PMC for an UE.

The OTA may contain more up-to-date information on a UE's cell level location due to the more frequent update process over the Wi-Fi ad-hoc network. The number of cells in the OTA for an UE is designed to be significantly smaller than that of the routing area or the tracking area list.

At S484, the PMC transmits the modified paging message to the eNodeB to be transmitted to the destination cells in the modified paging message.

At S486, the PMC starts a timer to be equal to a value T_phase1 after the PMC forwards the modified paging messages at S484. The value of T_phase1 is smaller than a timer used for network paging timeout at the SGSN (for UMTS) and the MME (for LTE), such that steps S484-S494 finish before the network paging timer expires and the RAN decides the UE is not in an idle/sleep mode in the cells included in the OTA. However, the UE can be in an idle/sleep mode in the cells of the RAN not included in the OTA.

At S488, the PMC determines whether the PMC receives an acknowledgment message from the UE indicating the UE has established a Radio Resource Control (RRC) connection with the RAN and is connected to the RAN. The acknowledgment message is a paging response message. This procedure is specified in 3GPP TS 23.195-v5.4.0 3rd Generation Partnership Project; *Technical Specification Group Services and System Aspects; Provision of User Equipment Specific Behavior Information (UESBI) to network entities* (Release 5), September 2004.

If the PMC does not receive the acknowledgment message (paging response message), the PMC determines whether the timer has expired at S490. If the timer has not expired, the timer continues to run at S492 and the PMC continues to monitor the RAN for an acknowledgment message (paging response message) at S488.

If an acknowledgment message is received by the PMC, the method ends at S496. If the acknowledgment message is not received at S488 and the timer expires at S490, the PMC transmits the original paging messages generated by the SGSN (in UTMS) and the MME (in LTE) for the UE to cells that are in the routing area (for UMTS) or tracking area list (in LTE) but that are not in the OTA at S494.

Because of the higher frequency of CH update over the Wi-Fi ad-hoc network than the original routing/tracking area update frequency, the OTA stored at the PMC is significantly smaller than the routing area or the tracking area list. Thus, the number of cells that received the modified paging messages is significantly smaller than the number of cells in the routing area or tracking area list.

The process that enables the PMC to reduce page messages is the cluster membership tracking process over the Wi-Fi ad-hoc network. Periodically, the UE in IDLE state wakes up its Wi-Fi interface to send update messages to its Cluster Head (CH).

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A paging message controller, the paging message controller including a processor and an associated memory, the processor configured to:
   obtain an indication of a paging message for a particular user equipment (UE), the indication indicating that a paging message is to be forwarded to at least one destination cell of a first set of cells for paging the particular UE;
   modify the paging message with location information for a representative UE of a second set of cells to which the particular UE belongs, the representative UE being a UE, within the second set of cells, that is different than the particular UE; and
   forward the modified paging message to the second set of cells for paging the particular UE.

2. The paging message controller of claim 1, wherein the first set of cells consists of all cells of a routing area or a tracking area.

3. The paging message controller of claim 1, wherein the second set of cells is smaller than the first set of cells, a subset of the first set of cells, or a subset of and smaller than the first set of cells.

4. The paging message controller of claim 1, wherein the paging message controller is configured to receive the second set of cells from a tracking application server.

5. The paging message controller of claim 1, wherein the second set of cells is for identifying a group of cells visited by the particular UE in a time period.

6. The paging message controller of claim 5, wherein the time period is a time since the particular UE was last connected to a radio access network (RAN).

7. The paging message controller of claim 1, further comprising:
an associated tracking application server (T-AS), the associated T-AS configured to receive cell level location information, wherein the cell level location information identifies a user equipment-to-cell identifier (UE-to-cell identifier) mapping for the particular UE, and configured to update the second set of cells for the particular UE based on a cell identifier of the UE-to-cell identifier mapping.

8. The paging message controller of claim 7, wherein the associated T-AS is configured to receive the cell level location information over at least one of a Universal Mobile Telecommunications System Terrestrial Radio Access Network (UTRAN) interface, a Long Term Evolution (LTE) network interface, and a IEEE 802.11 network interface.

9. The paging message controller of claim 1, wherein the indication indicates that the paging message is to be forwarded to a list of cells in a routing area or a tracking area, and
the processor is configured to modify the indication, the modified indication indicating that the paging message is to be forwarded to the second set of cells.

10. The paging message controller of claim 1, wherein the indication indicates that the paging message is to be forwarded to a first cell of the first set of cells, and
the processor is configured to filter the paging message for paging the particular UE based on whether the first cell of the first set of cells is also a member of the second set of cells.

11. The paging message controller of claim 1, wherein the indication is a paging message for a first cell, and
the processor is configured to forward the paging message when the first cell is a member of the second set of cells.

12. The paging message controller of claim 11, wherein the processor is configured to suppress the paging message when the first cell is not a member of the second set of cells.

13. The paging message controller of claim 12, wherein the processor is configured to:
determine if the particular UE received at least one forwarded paging message; and
transmit at least one paging message that was suppressed when the determining determines the particular UE did not receive at least one forwarded paging message.

14. The paging message controller of claim 1, wherein, the processor is configured to forward the modified paging message to the representative UE using a primary radio interface which is different from a secondary radio interface,
the second radio interface for communications between the particular UE and the representative UE for verifying that both the particular UE and the representative UE belong to the second set of cells.

15. A method of controlling paging in a radio access network (RAN), the method comprising:
obtaining at a paging controller an indication of a paging message for a particular user equipment (UE), the indication indicating that at least one paging message is to be forwarded to at least one destination cell of a first set of cells for paging the particular UE;
modifying at the paging controller the paging message with location information for a representative UE of a second set of cells to which the particular UE belongs, the representative UE being a UE, within the second set of cells, that is different than the particular UE; and
forwarding by the paging controller the modified paging message to the second set of cells for paging the particular UE.

16. The method of claim 15, wherein the first set of cells consists of all cells of a routing area or a tracking area.

17. The method of claim 15, wherein the second set of cells is smaller than the first set of cells, a subset of the first set of cells, or a subset of and smaller than the first set of cells.

18. The method of claim 15, wherein the second set of cells is received from a tracking application server and identifies a group of cells visited by the particular UE in a time period.

19. The method of claim 15, further comprising:
receiving cell level location information at a tracking application server (T-AS), wherein the cell level location information identifies a user equipment-to-cell identifier (UE-to-cell identifier) mapping for the particular UE; and
updating at the T-AS the second set of cells for the particular UE based on a cell identifier of the UE-to-cell identifier mapping.

20. The method of claim 15, wherein the cell level location information is received over at least one of a Universal Mobile Telecommunications System Terrestrial Radio Access Network (UTRAN) interface, a Long Term Evolution (LTE) network interface, and a IEEE 802.11 network interface.

21. The method of claim 15, wherein the indication indicates that the paging message is to be forwarded to a list of cells in a routing area or a tracking area, and the forwarding includes,
modifying the indication, the modified indication indicating that the paging message is to be forwarded to the second set of cells.

22. The method of claim 15, wherein the indication is a paging message for a first cell, and the forwarding includes,
forwarding the paging message when the first cell is a member of the second set of cells.

23. The method of claim 22, wherein the forwarding comprises suppressing the paging message when the first cell is not a member of the second set of cells.

24. The method of claim 23, further comprising:
determining if the particular UE received at least one forwarded paging message; and
transmitting at least one paging message that was suppressed when the determining determines the particular UE did not receive at least one forwarded paging message.

25. The method of claim 15, wherein,
the forwarding of the modified paging message to the representative UE is accomplished using a primary radio interface which is different from a secondary radio interface,
the second radio interface for communications between the particular UE and the representative UE for verifying that both the particular UE and the representative UE belong to the second set of cells.

* * * * *